Aug. 2, 1966 A. B. LINDQUIST 3,264,616

RANGE AND FIELD RETRIEVAL ASSOCIATIVE MEMORY

Filed Dec. 16, 1963 3 Sheets-Sheet 1

INVENTOR
ARWIN B. LINDQUIST
BY John F. Osterndorf
ATTORNEY

United States Patent Office 3,264,616

Patented August 2, 1966

3,264,616

RANGE AND FIELD RETRIEVAL ASSOCIATIVE MEMORY

Arwin B. Lindquist, Poughkeepsie, N.Y., assignor to International Business Machines Corporation, New York, N.Y., a corporation of New York Filed Dec. 16, 1963, Ser. No. 330,768

11 Claims. (Cl. 340—172.5)

Figure 1:
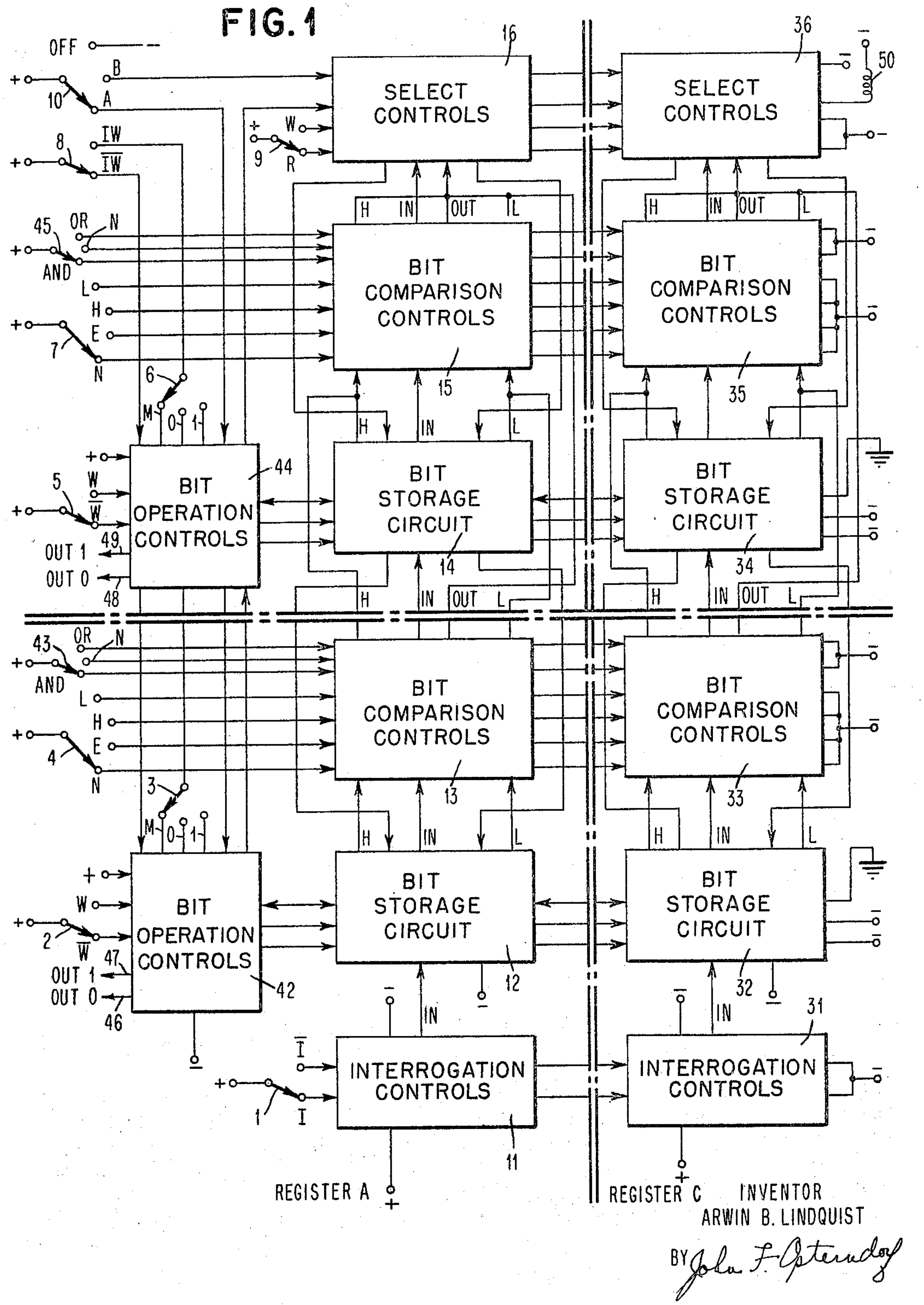

This invention relates to digital data memory apparatus and, more particularly, to an associative memory system capable of data retrieval within selected ranges in selected word fields in response to specified range and field criteria which may differ from field to field.

To facilitate data sorting in the utilization of a digital computer, associative or content addressed memories have been proposed. An associative memory is defined as a memory in which a data unit, such as a word, is retrieved or stored by specifying part or all of the data content of the word. This is accomplished by supplying signals to the storage registers of the memory; the signals being representative of some or all of the data to be stored in or retrieved from the storage registers. Comparison is made of the signals with the stored data to select those registers containing the specified portion of the data. Transferral of the desired data into or out of the memory is then performed according to the operation selected for the memory. When it is desired to compare certain storage positions with the signals and to exclude others, the excluded storage positions are "masked out" of the comparison.

Associative memories have been proposed which include many salient features including the retrieval of data according to a range of criteria, such as high, low or equal to a selected specification. Implementation of this feature has been described in copending application entitled "Associative Memory Ordered Retrieval," Serial No. 163,233, filed December 29, 1961 in the names of Rex R. Seeber and Arwin B. Lindquist and assigned to the same assignee as the present invention. Other features of this associative memory include the ability to write into a first vacant word register, to write selected fields of data into a word register and to write into or read from a multiple number of selected word registers. This memory also has the ability to select a register on the basis of all or a portion of its information content for the purpose of either writing into or reading out of the register. However, the associative memory described in the above application lacks the ability to retrieve associatively variable length fields of data within a word register by specifying range criteria which may differ from field to field.

Accordingly, it is a general object of the invention to provide an associative memory having improved data retrieval capabilities.

Another object of the invention provides for the retrieval of data from an associative memory by establishing selected range and field criteria for a word register according to a predetermined relationship from field to field.

It is another object of the invention to provide an associative memory capable of selectively retrieving data from variable length fields within each word register of the memory according to range criteria differing from one field of data to another field of data.

A further object of the invention is to provide an associative memory having provision for retrieving data according to a selection of range criteria including higher-than, lower-than or equal to a particular value as well as a "don't care" condition concerning the value.

Associative memories have been described utilizing cryogenic circuit devices and techniques. Thus, the aforementioned pending application utilizes superconductors to perform a selection on a range of values, rather than an equal value only. In addition, utilization of particular simplified and more effective superconductor storage circuitry is described in copending application entitled "Persistent Supercurrent Associative Memory," Serial No. 77,777, filed December 22, 1960 in the name of A. B. Lindquist and assigned to the same assignee as the present invention. The memory of the present invention achieves the improved data retrieval capabilities by utilizing improved and simplified persistent superconductor circuitry.

Thus, it is another object of the invention to provide an associative memory with varying range and field criteria data retrieval capabilities and utilizing substantially simplified circuitry as compared with associative memories previously described as utilizing superconductor techniques.

A further object of the invention is to provide a memory system employing storage circuits capable of storing three states of informtaion including a mask or "don't care" state; the storage circuits being arranged so that interrogation of a storage circuit in the mask state provides an indication that the circuit is in range with an established specification.

Briefly, the foregoing objects are accomplished by providing an associative memory system capable of performing variable field length and variable range criteria combinatorial associations. The memory system comprises a plurality of word storage registers. Each register includes a plurality of binary bit positions for each word. The bits of a word register are arranged in fields which may be of variable length and are connected to range criteria circuitry. Interrogation circuitry controlled by the storage circuitry and the range criteria circuitry operates to provide conductive paths through all fields of a word register satisfying the criteria for each field.

According to one aspect of the invention, provision is made for the inclusion of storage circuitry and control comparison circuitry for each bit position of each word register. Associated with each word register is an interrogating control circuit and a select control circuit. With comparable bits of each register, there is also provided a bit control circuit and a comparison selection circuit. Operation of the select control circuits occurs in response to signals provided from a read-write control circuit and a read-write cycle switch. Additionally, an interrogate-write control circuit is provided to control the bit control circuits associated with comparable bit positions in each word register. The comparison selection circuitry enables the comparison to be made according to different criteria.

For this purpose, another feature of the invention provides for means to be included in the comparison selection circuit for establishing a choice of relationship from one field of data to another field of data. This permits the comparison of an established specification of criteria with the stored data to be made for a particular logical relationship between fields of data. It also allows a range comparison to be made on a high, low, equal or "don't care" basis within each of a plurality of fields for each data word register.

To illustrate, if a test word comprises four fields 1–4 of data of eight bit positions each, then each of the multiplicity of data words stored in the registers of the memory may be compared on a four field basis with the test word. The word register which best responds to the comparison is the select word. For example, the comparison criteria could be established as follows:

OR Field 1—Select word high with respect to the test word
AND Field 2—Select word low with respect to the test word
AND Field 3—Select word equal to the test word AND Field 4—Mask (Don't care how test word compares with select word)

The established range comparison criteria identifies all selected words having field 1 higher than the specified word as well as all selected words with field 2 lower than the specified word and field 3 equal to the specified word. Fulfillment of the field 1 criteria in this example is all that is necessary to identify a selected word OR, alternatively, fulfillment of the criteria for the fields 2, 3 AND 4 is required to identify a select word. Thus, with the increased criteria selectivity of this invention, sorting and merging of data are simplified. This facilitates the storage and retrieval of data from the memory by substantially reducing the number of interrogations that must be made in order to identify the particular selected word.

Thus, an advantage of the invention provides for multiple sorting operations without physically rearranging data within the memory. With the multiple field and multiple range criteria selectivity, the capability exists for identifying the data in the word registers which best satisfy the criteria of interrogation in the retrieval, even though the satisfaction is not exact.

Figure 2:
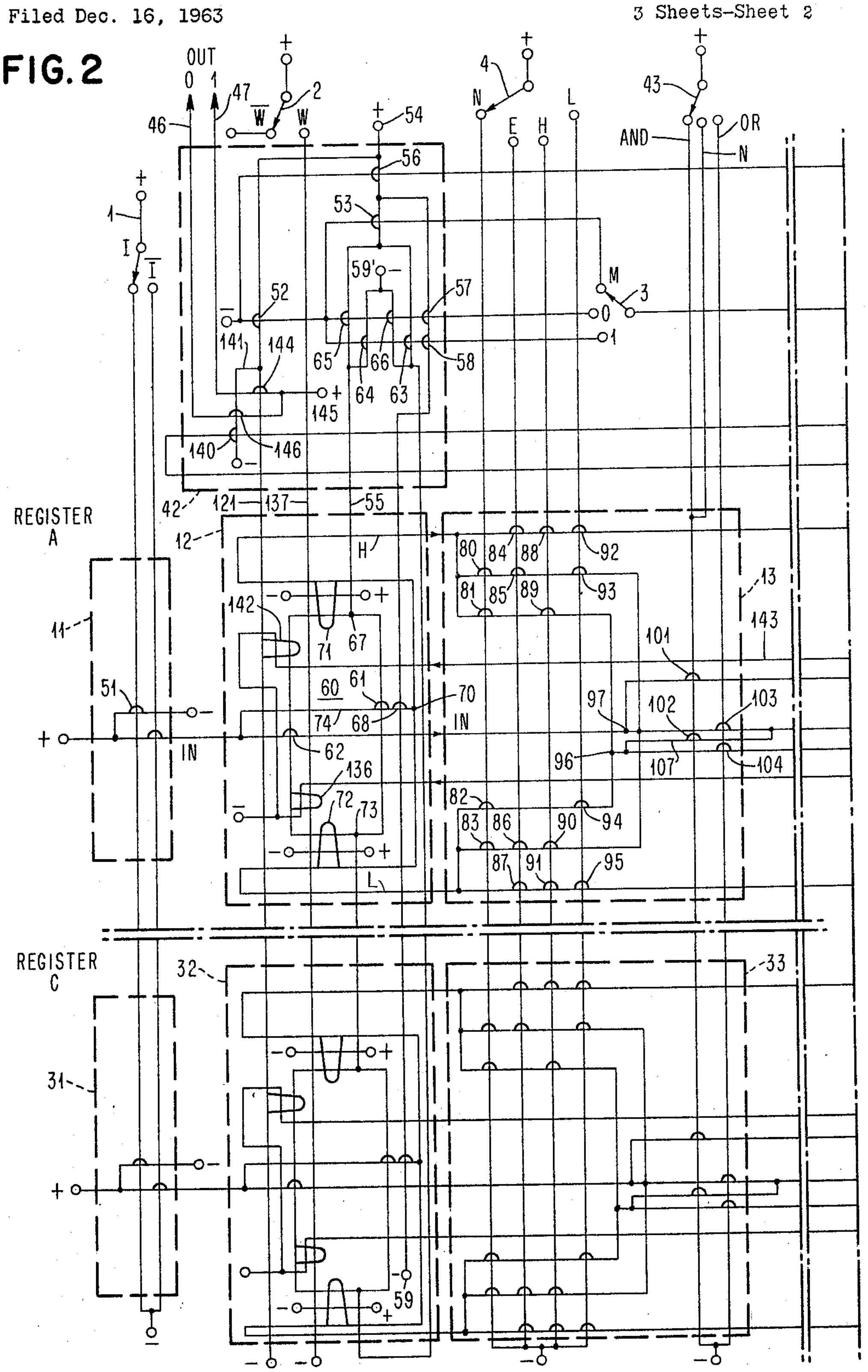
Figure 3:
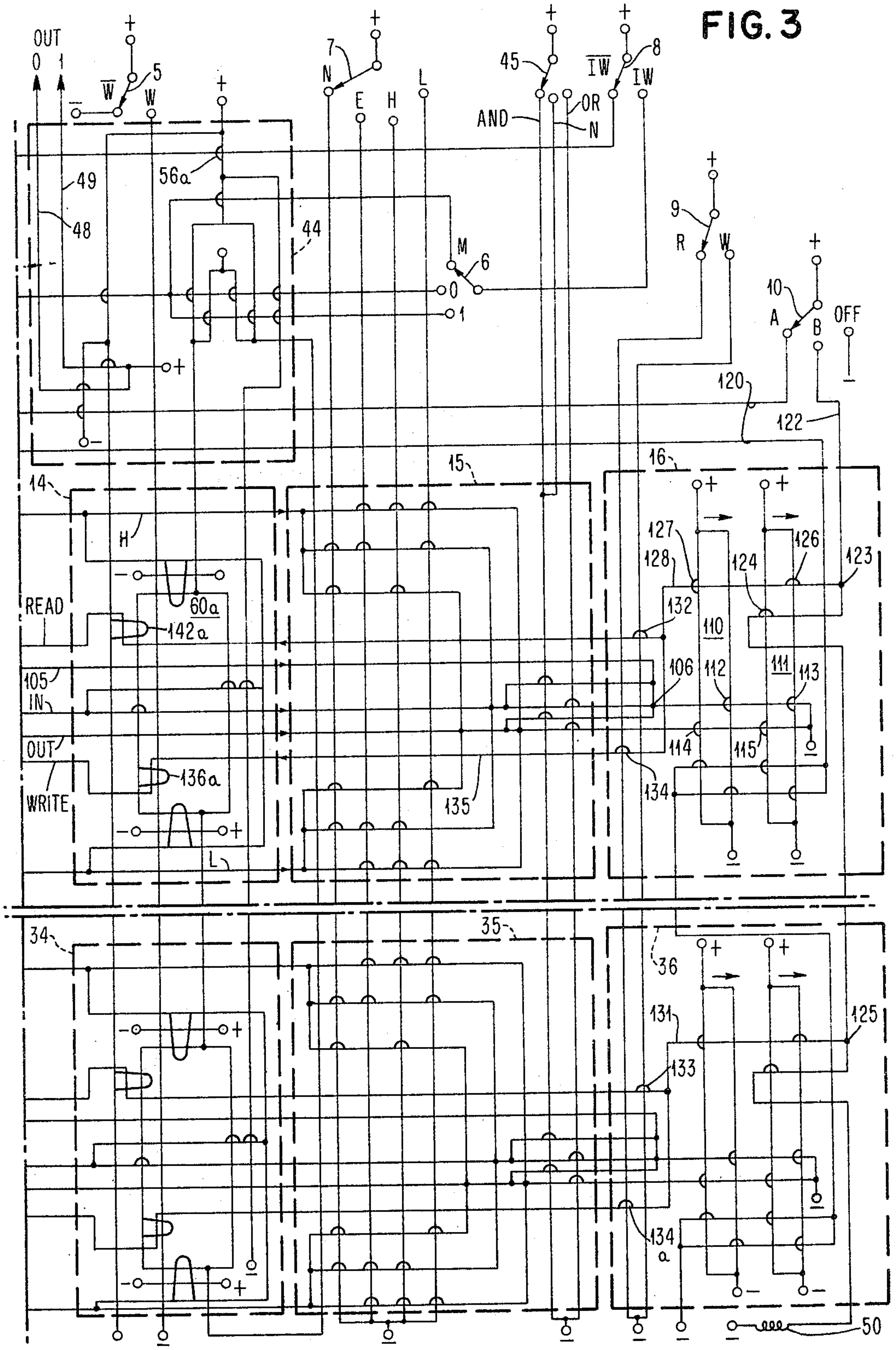

The foregoing and other objects, features and advantages of the invention will be apparent from the following more particular description of the preferred embodiment of the invention, as illustrated in the accompanying drawings, wherein:

FIGURE 1 is a block diagram of an associative memory embodying the principles of the invention and including only representative memory cells; and, FIGURES 2 and 3 are schematic diagrams of the circuits of the block diagram of the associative memory of FIGURE 1.

Referring now to FIGURE 1, the memory system embodying the principles of the invention is generally indicated in block form as comprising representative word registers, indicated as REGISTER A and REGISTER C. Each register includes an interrogation control circuit 11 and 31, two representative bit positions and a select control circuit 16 and 36. Each of the bit positions includes a bit storage circuit 12, 14 in REGISTER A and 32, 34 in REGISTER C and an associated bit comparison control circuit 13, 15 and 33, 35, respectively. Although only two registers and two bit positions for each register have been depicted, it is to be understood that in practice additional registers are employed utilizing many more such bit positions in each register.

Associated with like positioned bit storage circuits in the registers is a bit operation control circuit 42 for the bit circuits 12 and 32 and control circuit 44 for the bit circuits 14 and 34. The bit operation control circuits are connected to a write ON-OFF switch. Circuit 42 is connected to switch 2 and circuit 44 is connected to switch 5. The bit operation control circuits 42 and 44 are also connected to the input circuits 3 and 6 and provide 0 and 1 outputs at the terminals 46, 47 and 48, 49, respectively.

Comparison control switches are also associated with like positioned bit comparison control circuits in the word registers. These switches include range specifying circuits 4 and 7 for the control circuits 13, 33 and 15, 35, respectively, and field specifying circuits 43 and 45 for the control circuits 13, 33 and 15, 35, respectively.

Connected to each of the select control circuits 16, 36 are a read-write (R–W) operating switch 9 and a cycling (A–B–OFF) switch 10 for controlling the read-write operation. An interrogate-write (IW–$\overline{\text{IW}}$) ON-OFF switch 8 is connected into the bit control circuit 44 through an input switch 6 and from circuit 44 to the bit control circuit 42 through the input switch 3. An interrogate (I–$\overline{\text{I}}$) ON-OFF switch 1 is connected to the interrogation control circuits 11 and 31 for the REGISTERS A and C.

In operation, reading or writing in the memory is preceded by an interrogation. This involves searching the memory to determine the word registers having information stored in them which satisfies the established boundary or specified conditions. The specified conditions determine the words to be interrogated and the range and field of the information that is sought in each word. During a memory interrogation the select bit contained in a register select control circuit 16, 36 is set to the 1 state for each register having information meeting the boundary or specified conditions and to the 0 state for each register that is outside of the boundary or specified conditions.

To perform the interrogation, interrogate switch 1 and interrogate-write switch 8 are set to their ON positions I and IW, respectively. When switch 8 is in position IW, current flows from the positive supply to the input switches 3 and 6 connected to the bit control circuits 42 and 44, respectively. The setting of the switches 3 and 6 determines the direction of current flow on the input lines going into each bit storage circuit of the memory. The connections of each input switch 3 and 6 are indicated as M, 0 and 1. No current flows on the input lines to the bit storage circuits if the switches are set to the M position indicative of a mask operation. However, when the switch is set to the 1 position, a positive current flows on this input line and when the switch is set to a 0 position, a negative current flows on this input line.

Connecting switch 1 to the ON position I permits current from the positive supply to be directed to the IN lines conected to the first bit position 12, 32 of each word register. This current is referred to as the compare current. Dependent on the position of the input switch 3 and the state of the information stored in the bit circuit 12, 32, the currents directed into the bit circuits on the IN lines are directed to either the high (H), Low (L) or IN lines which feed the bit comparison control circuits 13, 33, respectively.

In table I, the particular relationship is indicated for the bit circuit output line carrying current when the input switch (e.g. 3) is set to one of the three possible positions and the bit storage circuit is storing a particular binary value.

TABLE I

| State of Bit | State of Input Line | Output Line |
|---|---|---|
| 0 | 0 | IN |
| 0 | 1 | L |
| 0 | M | IN |
| 1 | 0 | H |
| 1 | 1 | IN |
| 1 | M | IN |

During an interrogation of the memory, the comparison switches including the range determining switches 4 and 7 and the field determinig switches 43 and 45 are connected to one of their respective positions to indicate the particular range and field specifications to be made in the circuits 13 and 33 as compared with the status of the information stored in the bit circuits 12 and 32, respectively, and similarly the comparison to be made in the circuits 15 and 35 with the information stored in the bit circuits 14 and 34.

The bit comparison controls, e.g., circuits 13 and 33 are conditioned by the switches to direct the compare current entering the circuits 13 and 33 on either the H, L or IN lines. For example, without considering the effect of a particular position for the field switches, if compare current is supplied from the interrogation control circuit 11 and it appears on the H line from the bit circuit 12, and the switch 4 is connected in the H position, then current will be directed on the IN line from the bit comparison control circuit 13 to the bit circuit 14 of the next bit position. Thus, as shown in Table II, the output line where the compare current is directed for each position of the range switch is indicated for the high and low input lines to the bit comparison control circuit.

TABLE II

| Line | Output Line Compare Switch Position | | | |
|---|---|---|---|---|
| | N | E | H | L |
| High | HIGH | OUT | IN | OUT |
| Low | LOW | OUT | OUT | IN |

The compare current leaving the bit comparison control circuit 13 on either the H or L line feeds into the bit comparison control circuit for the next bit position, e.g., circuit 15. If the compare current appears on the IN line from comparison control circuit 13, it feeds into the next lower order bit storage circuit, e.g. bit circuit 14. In this posiion, it is directed to one of the output lines for this position H, L or IN. As explained for the bit position 12, the current flows in a path determined by the position of the input switch 6 and the state of the information stored in this bit position. It is fed to the comparison control circuit 15 and compared with a range specification determined by the switch 7.

The current output from the circuit 15 flows on one of the lines indicated as H, L, IN or OUT. If the compare current appears on the OUT line, it remains on this line and enters the select control circuit 16 to indicate that this word register is outside of the boundary conditions or specifications established. If the compare current appears on the H or L lines coming out of the last bit comparison control circuit 15, it indicates that the register is out of range and, therefore, these lines are connected to the OUT line.

The IN line of the last bit comparison control circuit 15 is connected directly to the select control circuit 16. Thus, any compare current appearing on the IN line conditions the select control circuit to indicate that the content of the particular register is within the boundary conditions of the established specification.

To illustrate the significance of the positions chosen for the range switches 4 and 7, the input switches 3 and 6 and the fiield switches 43 and 45 during a memory interrogation, Table III is provided.

TABLE III

| Bit Position | 1 | 2 | 3 | 4 | 5 | 6 | 7 | 8 | 9 | 10 |
|---|---|---|---|---|---|---|---|---|---|---|
| Range Switches | N | N | E | N | N | L | N | H | N | N |
| Input Switches | 1 | 0 | I | 1 | 1 | 0 | 0 | I | M | M |
| Field Switches | N | N | A | N | N | A | N | A | N | N |

If it is assumed that the range input and field switches are set for a ten-bit position register, then during the memory interrogation all registers in the memory whose bit positions 1, 2 and 3 have information stored in them equivalent to 101 AND whose bit positions 4, 5, 6 are lower than 110 AND whose bit positions 7 and 8 are higher than 01, have the select bit of the select control circuit set to one. All of the other register select bits are set to zero.

The switches 43 and 45 are utilized for establishing the logical field relationship from field to field. In this illustration, the fields are established in groups. However, it should be understood that they could be established from bit position to bit position or they could be elimiated by merely setting all switches to the N or "don't care" position. As illustrated in this Table, if the range and field switches are set to the N position and the input switch is set to the M position as shown for the 9 and 10 bit positions, then the "don't care" condition is specified for the contents of these bit positions.

Writing into the memory system is accomplished after interrogation of the memory is performed. The interrogation indicates by the state of the select control circuits, those registers whose bit positions contain information satisfying the established specification or boundary conditions. In order to locate the first word register satisfying these specified boundary conditions, the register cycle switch 10 is set to the B position permitting current to flow sequentially into the select control circuits 16, 36 to locate the first select control circuit manifesting that its associated register meets the boundary conditions. For the first register meeting these conditions the current from the positive supply connected to position B of switch 10 is directed onto either the write or read line depending on the position of the read-write switch 9. To effect a write operation, switch 9 is placed in the W position and current from the B position of switch 10 appears on the write line of the first in-range register.

In order to accomplish the writing operation, the write switches 2 and 5 associated with the bit operation control circuit 42, 44 for each like positioned bit position of each register must be set to the ON position. Thus, as shown in FIGURE 1, the switches 2 and 5 must be set to the W position going into the bit operation control circuits 42 and 44, respectively, to permit writing to occur in those bit positions of the selected word register. Additionally, the input switches 3 and 6 associated with the control circuits 42 and 44 must be set to either the 0 or 1 position depending on the information to be written into the particular bit position. As already explained in the discussion of the interrogation operation, the setting of these switches determines the course of current flow on the input line from the interrogate-write switch 8. Writing occurs in a bit storage circuit where coincident current flow occurs on the write line from the write switches and on the input lines.

In order to read from the memory, an interrogation is first performed to indicate in the select control circuits the word registers meeting the established boundary or specification conditions. Then the interrogate-write switch 8 is set to the OFF position and the register cycle switch 10 is set to the A position permitting current to flow into the bit positions. Then the read-write switch 9 is set to the R position and the cycle switch 10 is set to position B. When switch 10 is positioned at B, the first in-range register is determined by the status of the select control circuits 16, 36 and current flows on the read line for this selected register. The output for this register then appears on either the 0 or 1 output lines for the bit position of the selected word register. As already mentioned, these output lines are indicated at 46 and 47 for the bit circuits 12 and 32 and 48, 49 for the bit positions 14, 34.

In order to read the remaining registers meeting the established specification, the register cycle switch 10 is set back to position A permitting current to flow again into the bit positions. At this time, the connection of switch 10 to the A position also switches the select control circuit of the next register, e.g. circuit 36, to an out-of-specfication condition. Then the cycle switch 10 is set to position B and the next register meeting the specification is read. Reading of each register takes place by cycling switch 10 from position A to position B until the end of the read cycle is indicated at 50. At this time all of the word registers have been read indicating their outputs at the output lines 46, 47 and 48, 49.

As previously stated, it is an object of the invention to implement this associative memory by utilizing cryogenic techniques as the circuit technology. Substantially simplified cryogenic storage circuitry is obtained as compared to that utilized in other cryogenic memories, by employing thin film crossed and biased in-line cryotrons.

In a thin film crossed cryotron, current flow in the control line prevents the gate line from conducting current. The magnitude of the current in the control line necessary to accomplish this is a function of the cryotron design. Throughout the description of this invention, it is to be understood that the flow of current in a control line has sufficient magnitude to prevent the gate line from conducting. For the in-line cryotron, the gate line is resistive when the currents in the two control lines flow in the same direction. For all other conditions of both types of in-line cryotrons, the gates are superconductive. For a particular description of thin film crossed cryotrons reference may be made to a previously filed U.S. application Serial No. 625,512, filed on November 30, 1956 in the name of R. L. Garwin. In-line cryotrons are described with greater particularity in a previously filed U.S. application Serial No. 16,431, filed on March 21, 1960, now Patent No. 3,191,055. Both of these applications have been assigned to the same assignee as that of the present invention.

Referring now to FIGURES 2 and 3, the bit positions and control circuitry of the memory are shown as employing cryogenic circuitry. To facilitate the understanding of the description of this circuitry the circuit blocks are shown in dashed line form.

As already mentioned in the general description of the memory, operation takes place according to four aspects, namely, interrogation, selection of the first register having information within a particular range, write in and read out. In the detailed description of the memory embodying the principles of the invention, these four aspects of operation are discussed individually.

*Interrogation*

Interrogation of the memory is performed to determine the word registers having fields of data stored in them corresponding to the requirements established for a particular specification or set of boundary conditions.

In order to interrogate, the interrogate switch 1 is set to the I position rendering thin film cross cryotron 51 resistive. Current flows on the IN line to the bit circuit 12. Additionally, the intrrogate-write switch 8 is set to the IW position. Current flows to the input switches 3 and 6. The various bit input swiches represent the interrogating tag and are set to the M, 0 or 1 position as determined by the program. As already stated, when a bit input switch is set to the M or masking position, it indicates that a "don't care" condition has been established for that bit circuit position in the memory. Consequently, an IN range condition is established for that bit position regardless of the content of the bit storage circuits in that position of the registers. As will be explained more fully hereinafter, each bit storage circuit can be in one of three states, namely, a mask, a binary 0, or a binary 1. If the bit input switch is set to interrogate for a 0 or a 1, then that bit position is interrogated with a 0 or 1 signal, respectively.

For the purpose of describing the interrogation operation, bit circuit 12 is considered illustrative. If it is assumed that the input switch 3 is in the M position, then cryotrons 52, 53 are resistive preventing current from 54 from appearing on the lines 55 and 121. Current flow occurs through cryotrons 56, 57 and 58 and bit circuits 12 and 32 to a current sink at 59. Input line 55 is connected to the storage loop 60 in bit circuit 12. Since no current is flowing on line 55, any persistent current in this loop remains unchanged. For purposes of description, it is assumed that a binary 0 is represented in the storage loops by a counterclockwise persistent circulating current having one-half a predetermined magnitude, for example, .5I. In similar manner, a binary 1 is represented by a clockwise persistent circulating current of .5I. The third or mask state of storage is represented by an absence of any persistent circulating current in the storage cell.

Referring now to the storage loop 60, cryotrons 61 and 62 are included in this loop. Cryotron 61 is designed so that a value of current equal to or exceeding .5I in its control line renders it resistive. On the other hand, cryotron 62 is designed so that a current magnitude of I is required to render it resistive. As a result, unless the persistent current of .5I circulating in the loop

60 is increased to the full amount (I), any compare current on the IN line from the interrogation control circuit 11 passes through cryotron 62 to the IN line going to the bit comparison circuit 13 and to the next succeeding bit position of the REGISTER A.

If the input switch 3 is in the 1 position, current flows on the input line 55. When such an occurrence takes place, cryotrons 52, 58, 63 and 64 are all resistive. This directs the current from source 54 through the gate lines of cryotrons 56, 53 and 65 to the input line 55 in a positive direction. Current flowing through the gate line of cryotron 66 is directed to the sink 59'.

As previously mentioned, it has been assumed that the storage of a 0 in a loop is represented by a counterclockwise persistent circulating current of .5I, the storage of a 1 is represented by a clockwise circulating current of .5I and the storage of a mask is represented by the absence of any circulating current. Thus, with a binary 1 stored in the loop 60, a clockwise persistent current is flowing having a magnitude of .5I. The positive current flowing on input line 55 divides evenly at the node 67 since both paths of loop 60 are superconducting. A net current results in the left path equal to zero and in the right path equal to a magnitude of I. The current in the right path maintains cryotron 61 resistive and with no current in the left path cryotron 62 remains superconductive. As a result, the compare current on the IN line passes through cryotron 62 and to the IN line going to the bit comparison circuit 13.

If a counterclockwise current is circulating in loop 60, representing the storage of a 0, then the positive current on the input line results in a net current of I magnitude flowing in a counterclockwise direction in the left path and a zero current in the right path. Cryotron 62 becomes resistive and cryotron 61 superconductive. Hence, the comparing current on the IN line passes through cryotron 61 and cryotron 68 to a node 70.

Cryotron 68 is introduced into the storage loop to prevent current from flowing on line 74 during an interrogation with a mask condition, i.e. when the input switch 3 is in the M position. During such a condition, current flows from source 54 through cryotrons 56, 57 and 58 to cryotron 68 rendering it resistive. With cryotron 68 resistive, current entering bit circuit 12 on the IN line is prevented from flowing on line 74. Thus, current flowing on the IN line continues through the bit circuit to the bit comparison control circuit 13. If cryotron 68 had not been included in the storage loop, then both cryotrons 61 and 62 would be superconductive during a mask interrogation and the current entering bit circuit 12 on the IN line would be directed on line 74 as well as on the IN line.

Considering again that counterclockwise current flow is occurring in the loop 60, reference should be made to the two in-line cryotrons 71 and 72. As previously stated, an in-line cryotron is resistive when the current flow through the two lines of the device is in the same direction. Thus, cryotron 71 is resistive since the bias current and the current in the left path of loop 60 flow in the same direction. This prevents the gate line of cryotron 71 from conducting current. The current flow in the lines of cryotron 72, however, is in opposite directions and this device is superconductive. Therefore, the current at node 70 passes through the gate line of cryotron 72 to the low line (L). This indicates that the bit of information stored in this circuit is lower than the interrogating bit of information sought at the input switch 3 for bit position 12. The low line (L) current then passes into the bit comparison control circuit 13.

If no current is flowing in loop 60 representing a mask storage condition, then the positive current on the input line 55 splits in both directions at node 67 so that half goes around the left of the loop through cryotron 62 to node 73. The other half of the current goes around the right of the loop through the cryotron 61. The two currents merge again at node 73 and go down to the bit circuit 32 in the same bit position of the next word register to interrogate the storage loop of that circuit in the same manner. With .5I current circulating in the storage loop, cryotron 61 is resistive and cryotron 62 is superconductive. The two cryotrons are designed such that with .5I circulating in the loop 60, cryotron 61 is resistive and cryotron 62 is superconductive. Current entering bit circuit 12 on the IN line is then directed through cryotron 62 and proceeds to the bit comparison control circuit 13. This indicates that a match has occurred in the interrogation between a binary 1 and the mask storage condition existing in the loop 60.

Analogous operation takes place when the input switch 3 is set to the 0 position. In such an instance, cryotrons 52, 57, 65 and 66 are resistive. Thus, the current from source 54 passes through the gates of cryotrons 56, 53 and 63 to appear on input line 55 in a negative direction. The returning current then proceeds through the gate of cryotron 64 to the current sink 59'.

A negative current on line 55 reverses the current flow in the storage loop 60. Thus, if a 0 is stored in the loop, a net current I flows up the right half of the loop and zero current flows in the left half. For loop 60, cryotrons 61 and 62 would be resistive and superconductive, respectively. Thus, any current entering bit circuit 12 on the IN line passes through the gate of cryotron 62 to the IN line for the bit comparison control circuit 13. This indicates that a match has occurred between the specified data and the data stored in the bit storage circuit 12 of this register.

Similarly, if the loop 60 stored a 1, the negative current provided on line 55 results in a current of I magnitude flowing in the left path and zero current in the right path. Cryotron 62 is resistive and cryotron 61 superconductive permitting any compare current on the IN line to pass through the gate line of cryotrons 61 and 68 to node 70. Since the in-line cryotron 72 is resistive and the in-line cryotron 71 superconductive, the current at node 70 is routed through the gate line of cryotron 71 to the high line (H). The H line current then flows to the bit comparison control circuit 13.

If a mask condition is stored in the loop 60 and interrogation with a zero takes place by setting the switch 3 to the 0 position, current flow is in the negative direction and splits at the node 73 enabling .5I to go to the left of the loop and .5I to go to the right of the loop. Again, cryotron 61 is resistive and cryotron 62 superconductive. The current entering the bit storage circuit 12 on the IN line passes through cryotron 62 to the bit comparison control circuit 13.

Referring now to the comparison control circuit 13 and to its associated range specifying switch 4 and field specifying switch 43, there is provided a four way range selector and a three way field selector. The range switch 4 provides for "don't care" (N), Equal (E), High (H) and Low (L) range conditions.

When a range switch 4 is in the N position, any current flowing from a bit storage circuit, e.g. 12, on either the high (H) or low (L) lines continues to flow on that line to the next bit storage circuit, or, in the case of the last bit circuit of a register, to the select control circuit 16. This aspect of operation is apparent from a consideration of cryotrons 80, 81, 82 and 83. Current flow from the N position of switch 4 renders cryotrons 80–83 resistive preventing any current flowing on either the H or L lines, respectively, from flowing to the IN line connected to bit storage circuit 14 or to the OUT line connected to selector control circuit 16. In the event that a range specifying switch is not included for a particular bit position any current flowing on either the H or L lines continues to flow on that line and the absence of a switch is equivalent to setting a range switch to the N position.

If switch 4 is connected to the E position, cryotrons 84, 85, 86 and 87 are made resistive causing any current flowing on either the H or L lines to be directed to the OUT line at node 96 via cryotrons 81 and 89 or 82 and 94. Once current flow occurs on the OUT line, it can only be directed to another line through the operation of a field switch, such as 43. The operation of this switch will be described more fully hereinafter. Current flow on the OUT line indicates that the register is out of range and does not meet the specification established for the interrogation.

If range switch 4 is in the H position, cryotrons 88, 89, 90 and 91 are made resistive directing any current on the H line through cryotrons 80, 85 and 93 to the IN line at node 97. The H position of the switch 4 also directs any current on the L line through cryotrons 82 and 94 to the OUT line at node 96. With the range switch 4 in the L position, cryotrons 92, 93, 94 and 95 are rendered resistive. Any current flowing on the H and L lines, is similarly directed to the OUT and the IN lines, respectively.

As previously stated, any compare current from interrogation control circuit 11 is applied on the IN line to bit storage circuit 12. Dependent on the interrogation tag established at input switch 3, the information stored in storage loop 60 and the setting of range switch 4, this compare current is directed to either the IN, H or L lines. If current flow occurs on either the H or L lines, it is carried through bit storage circuit 14 to the next bit comparison control circuit 15 whereas current flow at nodes 96 or 97 is further controlled by field switch 43. This aspect of operation continues with the H and L lines merging into the OUT line. The OUT and IN lines of the last bit position then feed into the select control circuit, for example 16, where they become lines for the select echo bit and select bit.

The course of current flow of the current appearing at either the nodes 96 or 97 is determined by the field switch 43. As previously indicated, this switch is a three way switch for performing the AND and OR logical functions as well as a "don't care" function. However, the circuit design of the field switch 43 allows the AND and the "don't care" (N) positions to be one and the same. Therefore, if the switch 43 is set to the AND or the N position, cryotrons 101 and 102 are made resistive. Thus, if any current is present at node 97 it continues on the IN line to bit circuit 14. On the other hand, if any current is present at node 96, it continues on the OUT line through bit circuit 14 to the next bit comparison control circuit 15. The paradox occurs because the setting of the field switch is only significant on those bit positions where the range switch is set to either the E, H or L position. On those bit positions, the field switch must be set to either the AND or OR position. On all other bit positions, the field switch must be set to the N position. If switch 43 is connected to the OR position cryotrons 103, 104 are made resistive blocking the flow of current directly from the nodes 96 or 97. If current is present at node 97, it is by-passed through the gate line 105 of cryotron 101 to join the IN line at node 106 in the select control circuit 16. If current is present at node 96, it is by-passed through the gate line 107 of cryotron 102 to the IN line entering bit circuit 14. Thus, the relationship of bit-to-bit can be controlled in a logical manner, or, this relationship may be established on the basis of fields of bits by setting the field switch 43 for certain bit positions to the N position and by setting others to either the AND or the OR position.

Referring now to the select control circuit 16, any compare current appearing on the IN line in circuit 16 indicates that the register meets the established specification. It sets the select echo bit 110 and the select bit 111 to a binary 1 by rendering cryotrons 112 and 113 resistive. A binary 1 is represented in this control circuit by the flow of current of I magnitude in the left side of the bit. If the contents of the register do not meet the established specification, the compare current appears on the OUT line in circuit 16 and sets bits 110 and 111 to binary 0 by rendering cryotrons 114 and 115 resistive. Once the setting of the bits 110 and 111 has been established, the interrogate switch 1 and the interrogate-write switch 8 are set to the $\overline{I}$ and $\overline{IW}$ positions, respectively.

After the interrogation ends, any persistent circulating current in the storage bits 110 and 111 returns to its original magnitude of .5I current representing the 0's and 1's present in the storage bits before the interrogation. This aspect of operation is more readily apparent by recalling that in the storage bits where .5I persistent current is destroyed, then a current of I magnitude flows in either the left or the right path of each bit. The clockwise or counterclockwise direction circulation of the current in these paths is determined by the information states of the storage bits as previously explained for storage loop 60.

When the iterrogate-write switch 8 is set to the $\overline{IW}$ position, cryotrons 56 and **56*a* become resistive. When these cryotrons are made resistive, current is prevented from flowing on the input lines, such as 55**, resulting in a collapse of the electromagnetic field associated with each superconducting path of the loops. The collapse of an electromagnetic field results in a persistent .5I current circulating in the loop in the same direction as the original direction and in the same direction as the superconducting current. Thus, it may be concluded that a memory interrogation does not destroy the state of the stored data in a bit position.

*Selection of the first specification meeting register*

After the memory interrogation and prior to the actual performance of a read or write operation, location of the first register meeting the established specification must be accomplished.

If it is assumed that a memory interrogation has just been completed, then the storage bits 110 and 111 of the select control circuits 16 and 36 are set to either a 0 or 1 indicating, respectively, a register not meeting the specification or a register meeting it. Location of a register meeting the specification is accomplished by activating its select line. To perform this operation, the cycle operating switch 10 is cycled from position A to position B for each register that is to be conditioned for either a read or write operation.

When switch 10 is in position A, current flows on the line 120. This current conditions the read output control lines, for example the line 121 in the circuit 42, for an output operation. This line feeds all bit storage circuits in like positions in the registers. Line 120 after passing through each bit control circuit 42 and 44 returns and sequentially passes through each select control circuit 16, 36. When current flows on line 120, a transfer operation is also performed. The contents of the select echo bit of each circuit, for example 110 are transferred to its corresponding select bit, for example 111.

It will be more apparent from the description which follows hereinafter that it is necessary to perform this transfer operation when it is desired to read out or write into more than one register in sequence.

Setting switch 10 to position B causes current to flow on line 122. This current seeks out the first register meeting the established specifications. The current flow appears at the input node of the select control circuit of the first register, for example at 123 of circuit 16. If the bit 111 of circuit 16 is set to a 0 indicating that the register does not meet the established specification, the current on line 122 passes from node 123 through the gate line of cryotron 124 to the input node 125 of the select control circuit 36 for the next register. In this manner, if all registers do not meet the specification, the current passes on line 122 through all select control circuits to the read-write cycle indicator at 50. Indicator 50 shows that there are no registers in the memory system which meet the established specification.

If the bit 111 of circuit 16 is set to a 1, then the current on line 122 is directed at node 123 to the select line 128. It passes through the gate line of cryotron 126 and the control line of cryotron 127. The current on select line 128 renders cryotron 127 resistive setting bit 110 to 0. Setting the bit 110 of a selected register is important in the antonomous read and write operations. Thus, when it is desirable to read out or write into the second and succeeding registers having contents which satisfy the established specification, the cycle switch 10 is set back to the position A. At this time, the binary 0 in the select echo bit of the previously selected register (for example, bit 110 of circuit 16) is transferred to its select bit (bit 111) using the transfer circuits. If the cycle switch 10 is set to position B, the next register meeting the specification is located and current is established on its select line, for example line 131, of select control circuit 36.

*Write operation*

Assuming that current flow has been established on the select line of one of the registers meeting the specification, a write operation is performed by setting the interrogate-write switch 8 to the IW position. Read-write switch 9 is set to the W position. In addition, for the bit positions (for example, the bit storage circuit 12) where writing is to occur, the write switch 2 is set to the W position.

If the read-write switch 9 is considered first, it is apparent that with this switch in the W position, cryotrons 132 and 133 are resistive. If current is flowing on the select line 128 of select control circuit 16, it passes through the gate line of cryotron 134 to the write line 135 of REGISTER A. It is to be noted that the write line 135 serves as one of the control lines for the in-line cryotrons 136, **136*a*. These in-line cryotrons are called write cryotrons and are in the left path of the storage loops 60 and 60*a*, respectively. The second control line for the in-line write cryotron 136 is the line 137 which is connected to switch 2 at position W. Operation in the storage loop 60 is such that the cryotron 136 is resistive only when there is current on both the line 137 and the write line 135. In order to write into the storage loop 60, the write cryotron 136** is first made resistive to destroy any persistent current in the loop. The use of the in-line cryotron permits information to be entered in a selected field of a selected word register without destroying the contents of the other storage loops in the memory.

Referring to the interrogate-write switch 8, it is apparent that current is supplied from it to the input switches 3 and 6 when it is in the IW position. The input switches are set to the particular position of the information tag that is to be stored in the memory. As already explained, when input switch 3 is set to the 1 position, a positive current flows on the input line 55. If the input switch 3 is set to the 0 position, a negative current flows on line 55. To store information in storage loop 60, the write cryotron 136 is made resistive to destroy any persistent current in this loop. In addition, any current on the input line is directed around the right path of the loop. As soon as current of I magnitude flows around the right path of the loop, the cycle switch 10 is set to the OFF position. This destroys the current on the write line 135 which, in turn, makes the write cryotron 136 superconductive.

Even though the left path of loop 60 is now superconductive, current from the input line 55 does not flow in the left path since the inductance of a path without current flowing e.g. the left path, is greater than the inductance of a path with a constant current flow. Thereafter, the switch 8 is set to the $\overline{IW}$ position resulting in cryotrons 56 and **56*a* becoming resistive. With these cryotrons resistive, the current from a source 54 is directed down the left path through cryotron 52. This results in a decay of the current on the input line 55 leaving a persistent clockwise (representing a 1) or a counterclockwise (representing a 0) circulating current of .5I magnitude in loop 60. The actual magnitude of the persistent current is determined by the geometry of loop 60** and it is induced in the storage loop by the collapse of the electromagnetic field associated with the current flowing in the right path of the loop.

*Read operation*

To perform a read operation, the interrogate-write switch 8 is set to $\overline{IW}$ position. The read-write switch 9 is set to the read (R) position and the cycling switch 10 is cycled through the positions A and B for each register meeting the specification which is to be read. When the interrogate-write switch is in the $\overline{IW}$ position, cryotrons 56 and 56*a* are made resistive. Current is directed from the sources associated with each bit operation control circuit, e.g. from the source at 54 down the line 21.

Assuming the operating cycle switch 10 is set to position A, current flows on line 120 rendering cryotron 140 resistive. This directs the current onto the output control line 121. Once current is established on this line the cycle operating switch may be set to the B position. This renders the alternate output control line 141 superconductive. Line 141 does not conduct current at this time as its corresponding output control line 121 has current flowing in it. With the cycle switch 10 in position B, the first register meeting the established specification is located and current is established on its select line, for example, line 128 of REGISTER A. This aspect of operation has already been discussed and reference may be had to the description of the operation of the circuit 16 for it.

When read-write switch 9 is in the R position, current flows from this switch rendering cryotrons 134, 134*a* resistive. It has been assumed that REGISTER A meets the established specification and has current on its select line 128. This current then passes through the superconducting cryotron 132 and appears on the read line going into REGISTER A. The current on the read line is one of the control currents for the dual control in-line cryotrons, such as the cryotrons 142, 142*a*. One of these cryotrons is associated with each storage loop, e.g., the cryotron 142 is associated with the storage loop 60 permitting the current in the loop to act as the other control current for the cryotron. These cryotrons are designed to be resistive when the current on read line 143 and the current in the storage loop are passing through the read cryotron 142 in the same direction. For all other conditions of current flow, the read cryotrons are superconductive. Since the direction of current flow on the read line is from the select control circuit 16 onto each bit position of the register, it can be concluded that with current on read line 143, a binary 1 stored in the storage loop renders the read cryotron 142 resistive whereas a binary 0 stored in the loop leaves cryotron 142 superconducting.

For example, assume a binary 0 is stored in storage loop 60. With current on read line 143, the read cryotron 142 remains superconducting. Thus, the current established on the output control line 121 renders cryotron 144 resistive. Current then flows from source 145 through cryotron 146 to the binary 0 output line 46.

Assuming there was a binary 1 stored in the storage loop 60, the clockwise persistent circulating current having a magnitude equal to .5I along with the current on the read line 143 renders the read cryotron 142 resistive. With this cryotron resistive, the current on the output control line 121 is directed into its alternate output control line 141 rendering cryotron 146 resistive. Since the current no longer flows in line 121, cryotron 144 is rendered superconductive. This permits current to flow from source 145 through the gate line of cryotron 144 to the binary 1 output line at 47 manifesting that a binary 1 is stored in this bit position of the register meeting the established specification.

Reading of each register meeting the established specification is accomplished in similar manner by cycling the switch 10 alternately to position A and back to position B. In this manner, the contents of each bit position in each register meeting this specification appears at the output lines 46, 47 and 48, 49.

Since the reading operation is essentially a non-destructive operation, it is desirable to have the possibility of a destructive read operation. This can be performed if a vacancy bit position is established for each register, for example, the first bit position could be a vacancy bit and it would indicate a binary 1 is stored in its storage loop if the register contained information and a binary 0 is stored if it lacked any information. By changing the contents of the vacancy bit during the reading operation, a write while read operation occurs permitting the status of the vacancy bit to be changed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A memory system, comprising a plurality of registers for storing words of information, each register comprising a plurality of bit positions, circuit means coupled to the bit positions of said registers for controlling the interrogation, selection, reading and writing operations of said registers according to an established specification of information, and ranging and field determining means associated with like bit positions in each word register for establishing said specification of information, said specification being variable as to range and field among the bit positions in a register.

2. A memory system, comprising a plurality of registers for storing words of information, each register comprising a plurality of bit positions for storing individual bits of information in a binary code, circuit means coupled to the bit positions of said registers for controlling the interrogation, selection, reading and writing operations of said registers according to an established specification of information, and range criteria and combinatorial logical field relationship means associated with like bit positions in each word register for establishing said specification of information, said specification being variable as to the criteria and the field relationship among the bit positions in a register.

3. The memory system of claim 2 wherein the means for establishing the specification of variable combinatorial logical field relationships comprises circuit switching means for establishing OR, AND or "don't care" field relationships among bits of information.

4. The memory system of claim 2 wherein the means for establishing the specification of information according to variable range criteria comprises circuit switching means having high, low, equal and "don't care" range criteria controls.

5. A memory system, comprising a plurality of word storage registers for storing information manifested by a binary code, each register comprising a plurality of bit storage positions having a bit storage circuit and a comparison control circuit for comparing the storage status of its corresponding storage circuit with an established specification, circuit means including an interrogation control circuit connected to supply a current flow to a respective word register and a selection control circuit connected to receive the current flow from a respective word register and to register the status of the word register with respect to the established specification, said bit comparison control circuit determining the storage status of its corresponding storage circuit by controlling the path of current flow supplied by the interrogation control circuit from its corresponding storage circuit to the next succeeding storage circuit, said circuit means also including read and write control circuits coupled to each word register of the memory system for reading from or writing into selected bit positions according to a predetermined specification of information, and ranging and field determining means associated with like positioned bit comparison control circuits in each word register for establishing said specification of information, said specification establishing means being characterized by being selectable to have various range criteria and field relationships intermingled at the same time among the bit positions in a register.

6. The memory system of claim 5 wherein each bit storage circuit of each register comprises a continuous current path for storing three distinct states of information manifested as a current flow through the path in one direction indicative of a binary 1, a current flow through the path in the opposite direction indicative of a binary 0 and in the absence of any current flow in the path indicative of a mask or "don't care" storage condition, said storage circuit being responsive to the current flow from the interrogation control circuit in accordance with the established specification to enable the corresponding comparison control circuit to determine the status of the storage circuit indicating the meeting of the range specification for all information storage specifications when the storage circuit is storing a mask condition.

7. A memory system, comprising a plurality of word storage registers, each register comprising a plurality of bit storage positions having a bit storage circuit and a bit comparison control circuit, circuit means including interrogation control circuits, selection control circuits and reading and writing control circuits coupled to the bit storage positions in each register for controlling the operation of the memory system according to an interrogation, selection, read or write operation in response to an established specification of information, and circuit switching means connected to like positioned bit comparison control circuits in each word register for establishing said specification of information according to range criteria and field relationships variable as to criteria and field relationship among the like positioned bit comparison control circuits in each word register.

8. An associative memory having interrogation, read, write and selection control circuits coupled to it and operable to perform a desired operation according to an established specification of range criteria and field relationships, comprising a plurality of word registers connected so that each is coupled to respective interrogation and selection control circuits and so that each is responsive to said read and write control circuits, each register comprising a plurality of bit storage positions, each storage position being of the superconductor circuit type including a persistent superconductor storage circuit loop and a superconductor gate comparison control circuit responsive to the output of its respective storage loop, and specification establishing means coupled to like positioned comparison control circuits of each register for determining a particular specification of information, said means being characterized by including range criteria and field relationship determining means variable as to criteria and field relationship among the like positioned bit comparison control circuits of each register.

9. The associative memory of claim 8 wherein the specification establishing means includes switching circuitry for establishing combinatorial field associations between bit positions having range criteria variable according to a high, low, equal or "don't care" comparison.

10. The memory of claim 8, wherein each persistent superconductor storage loop comprises a continuous current path for storing three states of information manifested as a persistent current flow in one direction through the loop indicative of a binary 1, a persistent current flow in the opposite direction through the loop indicative of a binary 0 and in the absence of any persistent current flow in the loop indicative of a mask or "don't care" storage condition said storage position operating during a memory interrogation in response to current supplied from the interrogation control circuit and from currents supplied from the specification establishing means to indicate the meeting of the range specification for all information storage specifications when the storage loop is storing a mask condition.

11. An associative memory having interrogation, read, write and selection control circuits coupled to it and operable to perform a desired operation according to an established specification of range criteria and field relationships, comprising a plurality of word registers connected so that each is coupled to respective interrogation and selection control circuits and so that each is responsive to said read and write control circuits, each register comprising a plurality of bit storage positions, each storage position being of the superconductor circuit type including a persistent superconductor storage circuit loop and a superconductor gate comparison control circuit responsive to the output of its respective storage loop, and specification establishing means coupled to like positioned comparison control circuits of each register for determining a particular specification of information, said means being characterized by including switching circuits for setting a range criteria according to a high, low, equal or "don't care" criteria and for setting a field relationship according to an OR, AND or "don't care" combinatorial logical association with the range criteria and the field relationships established for like positioned comparison control circuits being variable among the last named circuits.

References Cited by the Examiner

UNITED STATES PATENTS

| | | | |
|---|---|---|---|
| 3,134,095 | 5/1964 | Heath | 340—172.5 |
| 3,195,109 | 7/1965 | Behnke | 340—172.5 |

ROBERT C. BAILEY, *Primary Examiner.*

G. D. SHAW, *Assistant Examiner.*